US006328281B1

(12) United States Patent
Jung

(10) Patent No.: US 6,328,281 B1
(45) Date of Patent: Dec. 11, 2001

(54) THROTTLE VALVE CASE

(76) Inventor: Eckhard Jung, Giessener Strasse 8, D-35510 Butzbach (DE)

( * ) Notice: Subject to any disclaimer, the term of this patent is extended or adjusted under 35 U.S.C. 154(b) by 0 days.

(21) Appl. No.: 09/462,292

(22) PCT Filed: Jun. 19, 1998

(86) PCT No.: PCT/EP98/03753

§ 371 Date: Mar. 10, 2000

§ 102(e) Date: Mar. 10, 2000

(87) PCT Pub. No.: WO99/01686

PCT Pub. Date: Jan. 14, 1999

(30) Foreign Application Priority Data

Apr. 7, 1997 (DE) ........................................ 197 28 564

(51) Int. Cl.[7] ........................................ F16K 1/22

(52) U.S. Cl. ........................................ 251/305

(58) Field of Search ........................................ 251/305

(56) References Cited

U.S. PATENT DOCUMENTS 2,624,541 * 1/1953 Zieboltz ........................ 251/305
3,753,549 8/1973 Rubright .
3,809,361 * 5/1974 Pfundstien et al. ........................ 251/305
4,905,647 * 3/1990 Kizer et al. ........................ 251/305
5,160,118 * 11/1992 Stary ........................ 251/305
5,194,186 * 3/1993 Edlund ........................ 251/305
5,315,975 * 5/1994 Hattori et al. ........................ 251/305
5,374,031 * 12/1994 Semence et al. ........................ 251/305
5,465,696 * 11/1995 Gmelin ........................ 251/305
5,480,123 * 1/1996 Bey ........................ 251/305
6,047,950 * 4/2000 Pontoppidan et al. ........................ 251/305

FOREIGN PATENT DOCUMENTS 2045639 4/1971 (DE) .
3244103 5/1984 (DE) .
4126366 2/1993 (DE) .
4311369 10/1993 (DE) .
4319015 12/1994 (DE) .
19638503 3/1997 (DE) .
2234497 1/1975 (FR) .
2616874 12/1988 (FR) .

OTHER PUBLICATIONS

Patent Abstracts of Japan, JP 07293712 A, Nov. 10, 1995.
Patent Abstracts of Japan, JP 3–15631 A, M–1098, Mar. 28, 1991 vol. 15/No. 129.

* cited by examiner

*Primary Examiner*—Kevin Shaver
*Assistant Examiner*—David A Bonderer
(74) *Attorney, Agent, or Firm*—Martin A. Farber

(57) ABSTRACT

A throttle body (1) with a throttle flap (2) which is mounted in such a way as to be rotatable in the throttle body (1) about a throttle-flap shaft (3), between a minimum position, in particular a closed position, and a maximum position, it being provided, that upstream and downstream in the direction of flow (5) and starting from the minimum position of the throttle flap (2), there extends a right cylindrical portion (7) and adjoining the right cylindrical portion (7) there is a spherical portion (8) with a center which coincides at least approximately with the center of the throttle-flap shaft (3) and with a radius which is greater than the radius of motion of the throttle flap (2).

9 Claims, 5 Drawing Sheets

THROTTLE VALVE CASE

FIELD AND BACKGROUND OF THE INVENTION

The invention relates in general terms to a device for controlling the mass flow rate of a liquid or gaseous medium and, in particular, to a throttle body in accordance with features.

Such devices are well known. DE 32 44 103 A1, for example, has disclosed a throttle body with a tubular housing, the housing having an overall cross section of flow bounded by an essentially circularcylindrical inner wall. When the flap mounted in the housing is rotated, the mass flow rate rises steeply with increasing rotation from a minimum position in the direction of a maximum position.

DE 43 19 015 A1 has likewise disclosed a device for controlling the mass flow rate in which the characteristic can be adapted within predeterminable ranges.

The disadvantage of these two devices, however, is that there is an excessive rise in the mass flow rate as the opening of the flap increases. As a result, there is a continuous increase in the mass flow rate over the working range of the flap, this being a disadvantage since the increase in the mass flow rate becomes too great as the opening of the flap increases. Particularly in the case of internal combustion engines in vehicles in which the power output is controlled by means of the position of the throttle flap, sensitive control of the power output is not possible if the air mass rises too steeply as the throttle flap is opened to an increasing extent.

SUMMARY OF THE INVENTION

The underlying object of the invention is therefore to provide a device for controlling the mass flow rate of a liquid or gaseous medium, in particular a throttle body, which avoids the disadvantages described at the outset and by means of which sensitive control or regulation of a process that can be varied by means of the setting of the flap can be achieved.

The configuration of the housing and/or the flap, by virtue of which an only slight change in the volume flow, in particular a slight increase in the volume flow, can be achieved over the range of motion (working range) of the flap, provides the advantage that, as the working range of the flap (opening of the flap) increases, the process influenced by the position of the flap is influenced only slightly and hence sensitive control and/or regulation of the process on the basis of the position of the flap is made possible. Thus, in a special configuration of the invention, an only slight change in the volume flow of up to 5% of the total mass flow rate changes, at least over a significant part of the working range of the flap amounting to 50% or more of the total working range. Over this significant part of the working range, the mass flow rate can increase or decrease.

A preferred area of application of the invention is in the field of power output control of internal combustion engines. However, other applications would also be conceivable where flaps are used in a tubular housing, e.g. for regulating the flow of liquids or regulating the air flow in air-conditioning systems in which fresh air or recirculated air or, alternatively, cold or heated air is to be fed to a passenger compartment of a vehicle.

In the text which follows, the invention is described with reference to a throttle body. To achieve the object it is provided, according to the invention, that upstream and downstream in the direction of flow and starting from a minimum position of the throttle flap, there extends a right cylindrical portion and adjoining the right cylindrical portion there is a spherical portion with a center which coincides at least approximately with the center of the throttle-flap shaft and with a radius which is greater than the radius of motion of the throttle flap. This has the advantage that it is possible with this configuration to achieve a characteristic where, starting from the minimum position, in particular the closed position, of the throttle flap, a steep rise in the mass of air passed through can be achieved in a small part of the working range, which is then followed by only a slight change (slight rise) in the air mass as the working range (opening) of the flap increases. This ensures that when a large volume of air is required by the internal combustion engine, this large volume can be made available to it, and sensitive regulation of the power output of the internal combustion engine is made possible in the adjoining range by virtue of the only slight increase in the air mass as the throttle flap opens further.

BRIEF DESCRIPTION OF THE INVENTION

Further design configurations of a throttle body according to the invention are explained below and described with reference to the figures, of which:

DETAILED DESCRIPTION OF THE PREFERRED EMBODIMENTS

Figure 3:
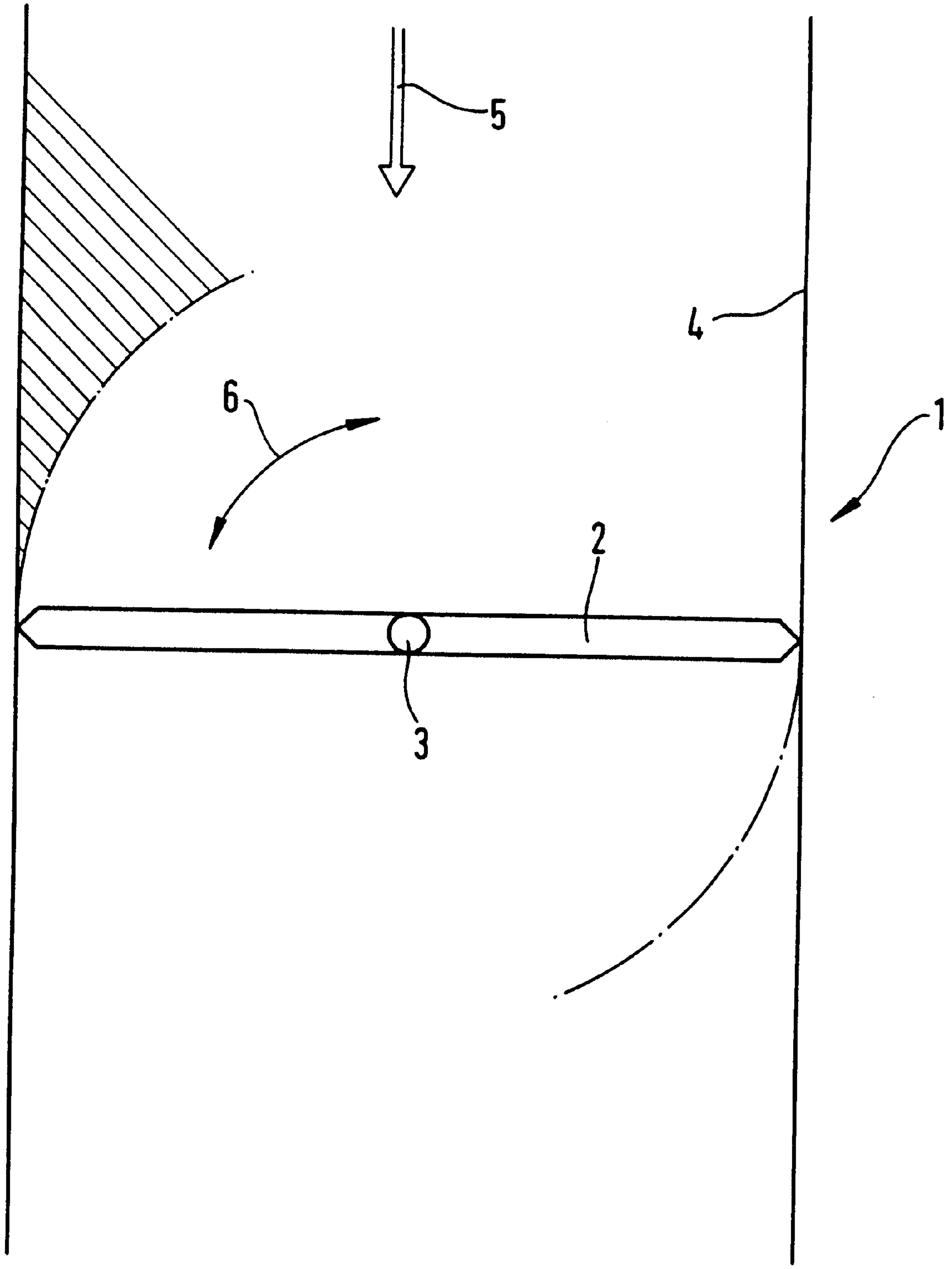
PRIOR ART Fig. 3
FIG. 3 shows a throttle body of cylindrical design in accordance with the prior art and FIG. 4 shows a throttle body of partially spherical design, likewise in accordance with the prior art.
Figure 4:
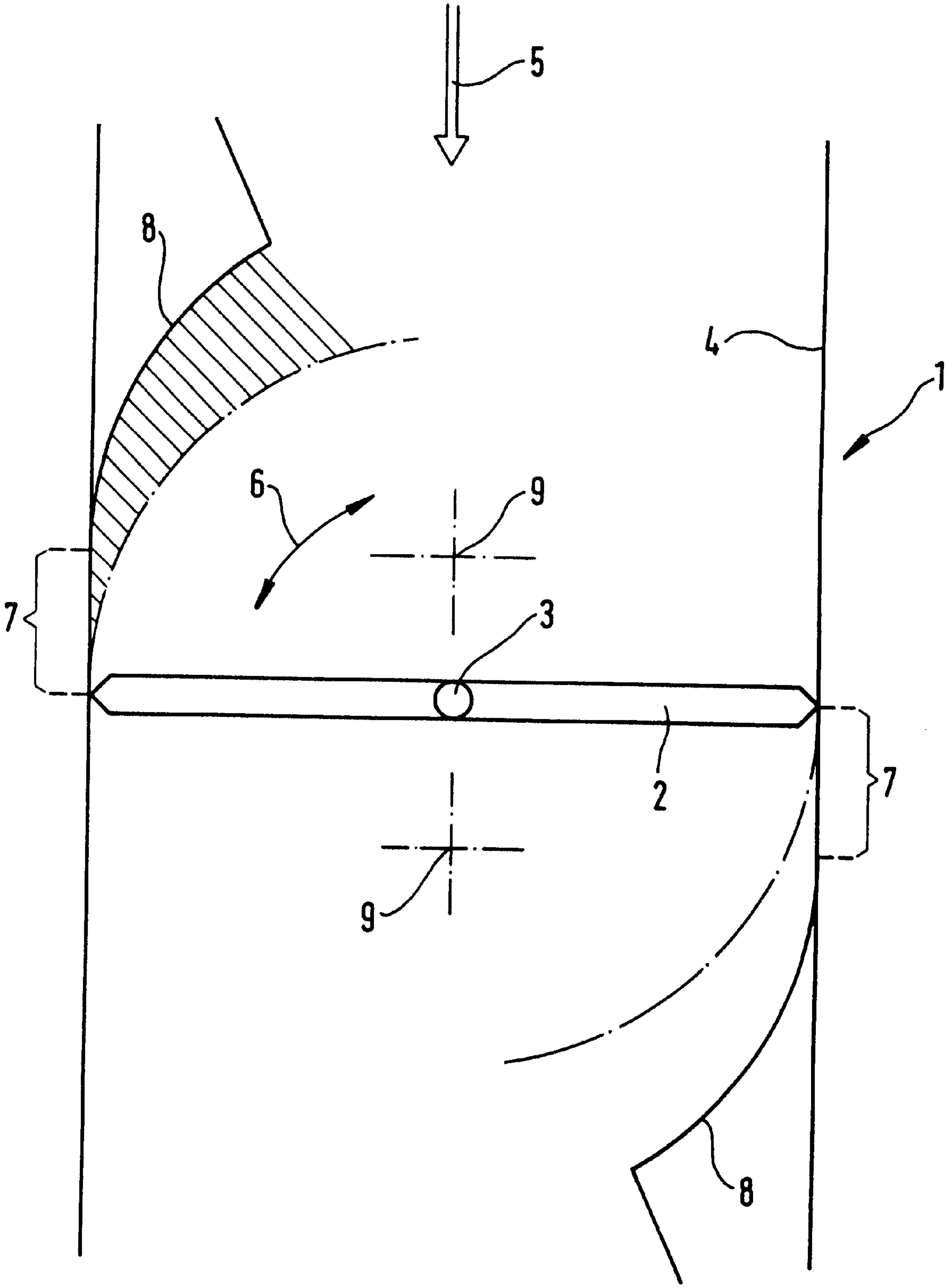
PRIOR ART Fig. 4

To illustrate the invention, it is described with regard to the prior art, the latter being represented schematically in FIGS. 3 and 4, to which reference is made initially.

Figure 2:
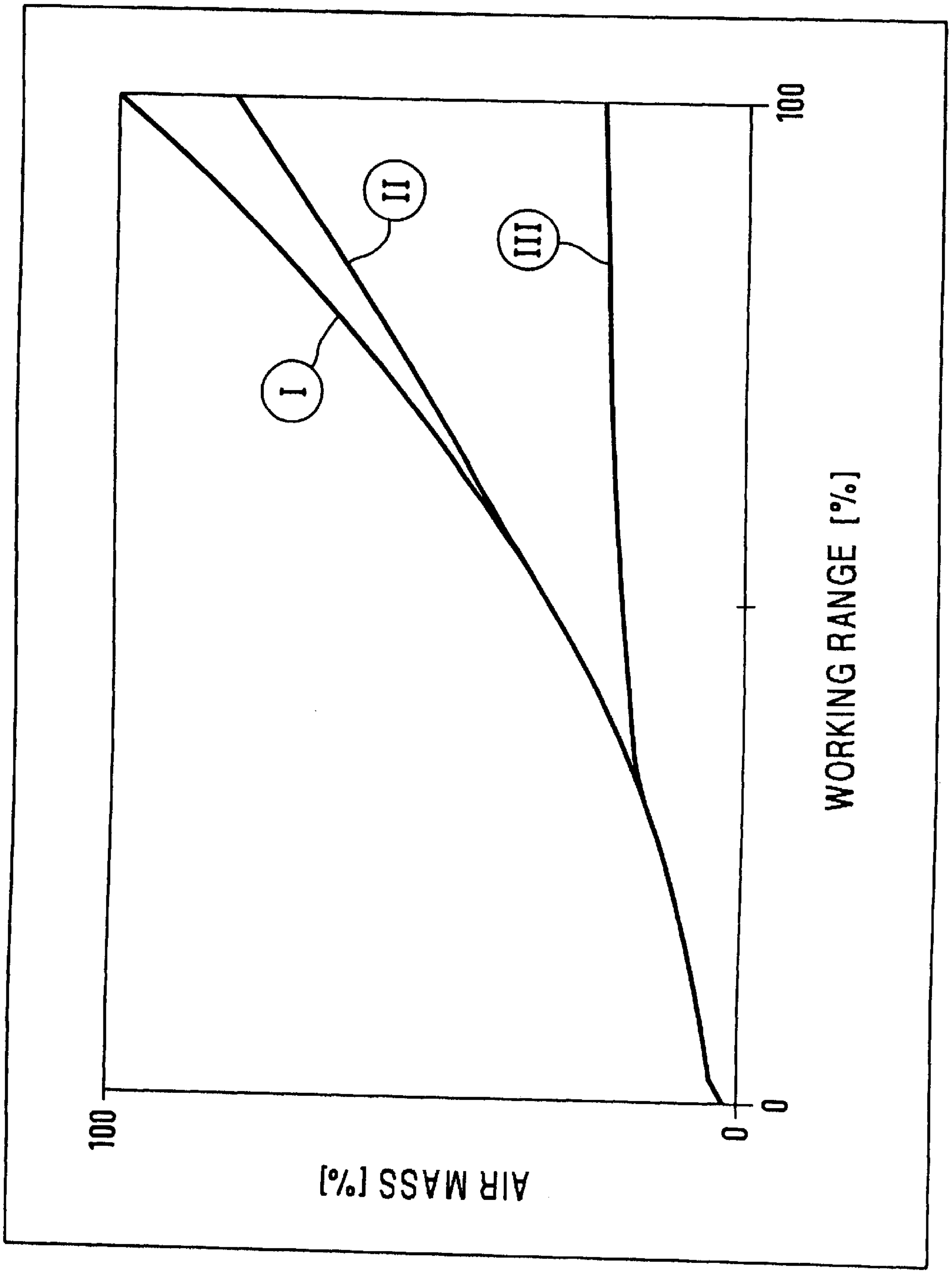
FIG. 2 shows an overview of characteristics of various throttle bodies.

FIG. 3 shows a throttle body 1 known from DE 32 44 103 A1. In this right-cylindrical throttle body 1, a throttle flap-2 is mounted rotatably by means of a throttle-flap shaft 3. In FIG. 3, the throttle flap 2 is shown in its minimum configuration (closed position), the ends (the outer circumference) of the throttle flap 2 resting against the inner wall 4 of the throttle body 1. Reference numeral 5 indicates a direction of flow of the air flowing through and reference numeral 6 indicates the direction of rotation of the throttle flap 2 from its closed position into a maximum position, which preferably corresponds to a 90° rotation out of the closed position, and vice versa. The path of motion of the throttle flap 2 is indicated by chain-dotted lines, showing that the volume flow (mass flow rate) disadvantageously increases in a superproportional manner with increasing rotation of the throttle flap 2 out of its closed position in the direction of the maximum position, this being indicated by the hatched area in FIG. 3. This results in the characteristic I illustrated in FIG. 2.

FIG. 4 reveals a design which already shows some improvement over the throttle body 1 shown in FIG. 3. This design shown in FIG. 4 corresponds essentially to the throttle body known from DE 43 19 015 A1. In the case of this throttle body 1 shown in FIG. 4, there is an adjoining right cylindrical portion 7 upstream and downstream in the direction of flow 5, starting from the closed position of the throttle flap 2, the right cylindrical portion 7 being adjoined by a spherical portion 8. The right cylindrical portion 7 and the spherical portion 8 thus form the inner wall 4 of the throttle body 1. Here too, the path of motion is indicated by chain-dotted lines, the radius of this path of motion of the throttle flap 2 and the radius of the spherical portion 8 being chosen so as to be equal; however, the center of the spherical portion 8 is arranged at the level of the right cylindrical portion 7. This means that the center of the throttle-flap shaft 3 and the center of the spherical portion, which center is denoted by the reference numeral 9, are different. With this design, it is thus possible to achieve the volume flow indicated, once again, by hatching in FIG. 4 and referred to as characteristic II in FIG. 2. This volume flow is likewise not optimum as regards the requirements.

Figure 1:
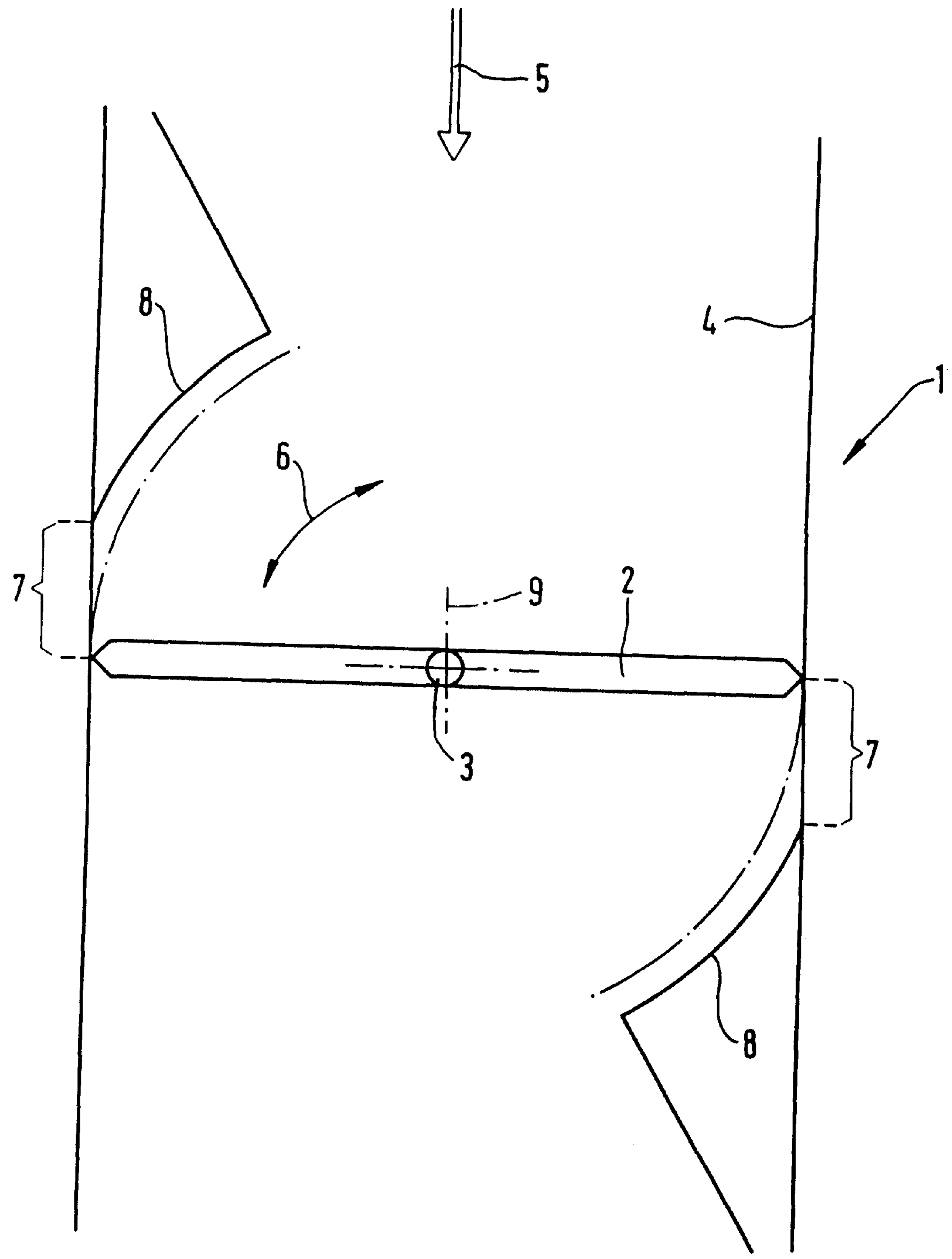
FIG. 1 shows a throttle body designed in accordance with the invention.

The configuration of the throttle body 1 provided by the invention is shown in FIG. 1, a right cylindrical portion 7 adjoined by a spherical portion 8 again being provided. The essential point for the invention is that the center of the path of motion of the throttle flap 2 and the center of the spherical portion 8 coincide, the radius of the spherical portion 8 being chosen so as to be greater than the radius of the path of motion of the throttle flap 2. In particular, the point of intersection of the spherical portion 8 and that end of the right cylindrical portion 7 which is remote from the closed position of the throttle flap 2 coincide, another point of significance being that the radius of the spherical portion 8 is greater than the radius of the throttle body 1. This geometrical configuration of the throttle body 1 results in a linear variation in the volume flow in a significant working range of the throttle flap 2, which linear variation is illustrated by means of the characteristic III in FIG. 2. To influence the characteristic III, it would be conceivable for the center of the spherical portion 8 not to coincide with the center of the throttle flap 2 (i.e. the throttle-flap shaft 3) but to be provided around it in the vicinity of it. The objective configuration of the throttle body provides for the right cylindrical portion 7 to have a circular profile and the spherical portion 8 to have the profile of a sphere, the two portions adjoining one another upstream and downstream in the direction of flow 5. If therefore the center of the circular profile (cylinder) and the spherical profile are the same, the spherical-zone geometry of the throttle body 1 results from the intersection of a sphere and a cylinder.

Figure 5:
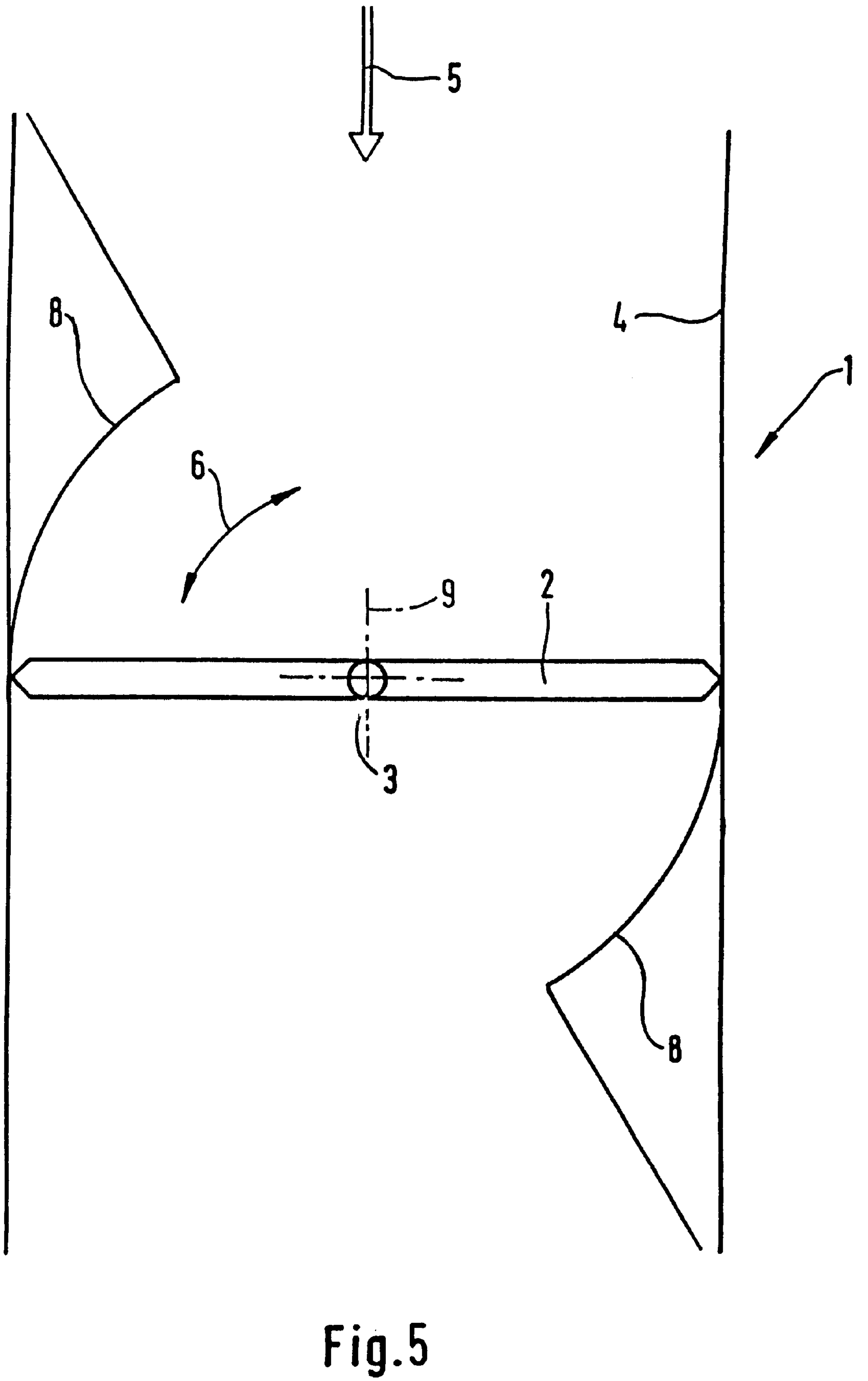
FIG. 5 shows a throttle valve in accordance with the present invention.

FIG. 5 show an advantageous embodiment wherein the center of the spherical portion 9 and the center of the throttle-flap shaft 3 are identical.

An advantageous configuration of the invention provides for the throttle body 1 to be produced from plastic, although production from other materials, such as diecast material or the like, is also conceivable. Production from plastic has the particular advantage that subsequent machining (with the exception, for example, of the removal of excess material due to production) can be avoided.

LIST OF REFERENCE NUMERALS

1. Throttle body
2. Throttle flap
3. Throttle-flap shaft
4. Inner wall
5. Direction of flow
6. Direction of rotation
7. Right cylindrical portion
8. Spherical portion
9. Center

What is claimed is:

1. A throttle body (1) with a throttle flap (2), which is mounted in such a way as to be rotatable in the throttle body (1) about a throttle-flap shaft (3), between a minimum position, in particular a closed position, and a maximum position, wherein, upstream and downstream in the direction of flow (5) and starting from the minimum position of the throttle flap (2), there extends a spherical portion (8), wherein the center point (9) of the spherical portion (8) and that of the throttle-flap shaft (3) are identical and the radius of the spherical portion motion of the throttle flap (2).

2. The throttle body (1) as claimed in claim 1, wherein the spherical portion (8) has a spherical profile.

3. The throttle body (1) as claimed in claim 1, wherein the throttle body (1) is produced from plastic.

4. The throttle body (1) as claimed in claim 1, wherein a volume flow lies within a predeterminable and substantially constant range.

5. The throttle body (1) as claimed in claim 1, wherein a volume flow as a function of throttle flap displacement is substantially linear over a substantial portion of a working range of the throttle flap.

6. The throttle body (1) as claimed in claim 1, wherein a change in volume flow of not more than 5% of a total flow rate occurs over at least 50% of a total working range of the throttle flap (2).

7. A throttle body (1) with a throttle flap (2) which is rotatably mounted in the throttle body (1) about a throttle-flap shaft (3), a spherical portion (8), wherein said throttle flap (2) rotates between the minimum position, in particular a closed position, and a maximum position, and wherein the spherical portion (8) which has a center point coinciding with the center point of the throttle-flap shaft (3), has a radius greater than the radius of motion of the throttle flap (2).

8. A throttle body (1) with a throttle flap (2), which is mounted in such a way as to be rotatable in the throttle body (1) about a throttle-flap shaft (3), between a minimum position, in particular a closed position, and a maximum position, wherein, upstream and downstream in the direction of flow (5) and starting from the minimum position of the throttle flap (2), there extends a straight cylindrical portion and adjoining the straight cylindrical portion (7) is a spherical portion (8) with a center point (9) which coincides with the center point of the throttle-flap shaft (3) and with a radius which is greater than the radius of motion of the throttle flap (2).

9. A throttle body (1) with a throttle flap (2) which is rotatably mounted in the throttle body (1) about a throttle-flap shaft (3), a straight cylindrical portion starting from a minimum position of the throttle flap (2) and extending upstream and downstream in direction of flow (5), a spherical portion (8) adjoining said straight cylindrical portion (7), wherein said throttle flap (2) rotates between the minimum position, in particular a closed position, and a maximum position, and wherein the spherical portion (8) which has a center point coinciding with the center point of the throttle-flap shaft (3), has a radius greater than the radius of motion of the throttle flap (2).

* * * * *